US012033215B2

(12) United States Patent
Prates de Oliveira et al.

(10) Patent No.: US 12,033,215 B2
(45) Date of Patent: Jul. 9, 2024

(54) PORTFOLIO PERFORMANCE PREDICTION

(71) Applicant: Copperleaf Technologies Inc., Vancouver (CA)

(72) Inventors: Danilo Prates de Oliveira, Vancouver (CA); Stanley Thomas Coleman, North Vancouver (CA); Nicholas Sertic, Vancouver (CA); William John Dall, New Westminster (CA); Diego Andres Gonzalez Suarez, Vancouver (CA)

(73) Assignee: Copperleaf Technologies Inc., Vancouver (CA)

(*) Notice: Subject to any disclaimer, the term of this patent is extended or adjusted under 35 U.S.C. 154(b) by 114 days.

(21) Appl. No.: 16/842,854

(22) Filed: Apr. 8, 2020

(65) Prior Publication Data

US 2021/0319513 A1  Oct. 14, 2021

(51) Int. Cl.
*G06Q 40/06* (2012.01)
*G06F 17/15* (2006.01)
(Continued)

(52) U.S. Cl.
CPC ............ *G06Q 40/06* (2013.01); *G06F 17/15* (2013.01); *G06F 17/18* (2013.01); *G06F 18/23* (2023.01); *G06N 20/00* (2019.01)

(58) Field of Classification Search
CPC .. G06Q 40/06; G06Q 40/00; G06Q 10/06375; G06Q 10/0637; G06Q 10/0633;
(Continued)

(56) References Cited

U.S. PATENT DOCUMENTS

2006/0044307 A1* 3/2006 Song ................ G06T 11/206
345/419
2007/0124186 A1* 5/2007 Virine .............. G06Q 10/06312
705/7.22
(Continued)

OTHER PUBLICATIONS

Hastie, et al.; The Elements of Statistical Learning; Chapter 14; Unsupervised Learning; Section 14.3 Cluster Analysis; pp. 501-528; downloaded from https://web.stanford.edu/~hastie/ElemStatLearn/.
(Continued)

*Primary Examiner* — Edward Chang
*Assistant Examiner* — Divesh Patel
(74) *Attorney, Agent, or Firm* — MOSER TABOADA

(57) ABSTRACT

A method, apparatus and system for portfolio performance prediction of a portfolio of projects include receiving information regarding at least start date delays, duration increases and cost overruns for at least one project of the portfolio of projects, determining at least one cluster for the at least one project from the received information regarding at least the start date delays, duration increases and cost overruns for the at least one project of the portfolio of projects, creating a statistical representation for each of the clusters of the at least one project of the portfolio, and predicting a performance of the portfolio of projects using information regarding the statistical representation of the clusters of the at least one project of the portfolio of projects.

23 Claims, 11 Drawing Sheets

(51) Int. Cl.
*G06F 17/18* (2006.01)
*G06F 18/23* (2023.01)
*G06N 20/00* (2019.01)

(58) Field of Classification Search
CPC .............. G06Q 10/0639; G06Q 10/067; G06Q 10/063; G06Q 10/0631; G06Q 10/06312; G06Q 10/06313; G06Q 10/06315; G06Q 10/06; G06Q 10/04; G06Q 10/00; G06N 20/00; G06F 17/15; G06F 17/18; G06F 17/00; G06K 9/6218
See application file for complete search history.

(56) References Cited

U.S. PATENT DOCUMENTS

| | | | |
|---|---|---|---|
| 2008/0313595 A1* | 12/2008 | Boulineau | G06Q 10/06313 717/101 |
| 2014/0074751 A1 | 3/2014 | Rocklitz | |
| 2016/0125306 A1* | 5/2016 | Jihn | G06N 7/01 706/52 |
| 2017/0147954 A1* | 5/2017 | Xiao | G06Q 10/06313 |

OTHER PUBLICATIONS

Hastie, et al.; The Elements of Statistical Learning; Chapter 15; Random Forests; pp. 587-604; https://web.stanford.edu/~hastie/ElemStatLearn/.

Hastie, et al.; The Elements of Statistical Learning; Chapter 16; Ensemble Learning; pp. 605-624; https://web.stanford.edu/~hastie/ElemStatLearn/.

Asset Management—An Anatomy by the Institute of Asset Management; Chapter 3; Asset Management Models and Management System; pp. 16-26; downloaded from https://theiam.org/media/1486/iam_anatomy_ver3_web-3.pdf.

Asset Management—An Anatomy by the Institute of Asset Management; Chapter 6; The Asset Management Subjects; Section 6.2 Group 2; Asset Management Decision-Making; pp. 37-49; downloaded from https://theiam.org/1486/iam_anatomy_ver3_web-3.pdf.

Murphy; Probabilistic Machine Learning; Machine Learning: A Probabilistic Perspective; Chapter 1 Introduction; Section 1.2 Supervised Learning & Section 1.3 Unsupervised Learning; pp. 3-16; downloaded from https://probml.github.io/pml-book.

Murphy; Probabilistic Machine Learning; Machine Learning: A Probabilistic Perspective; Chapter 2 Probability; Section 2.3 Some common discrete distributions; pp. 34-37; downloaded from https://probml.github.io/pml-book.

Murphy; Probabilistic Machine Learning; Machine Learning: A Probabilistic Perspective; Chapter 25 Clustering; pp. 875-906; downloaded from https://probml.github.io/pml-book.

Murphy; Probabilistic Machine Learning; Probabilistic Machine Learning: An Introduction; Chapter IV Nonparametric Models; pp. 543-625; downloaded from https://probml.github.io/pml-book.

International Search Report & Written Opinion dated Jul. 21, 2021 for Application No. PCT/US2021/025318, 9 pgs.

\* cited by examiner

| Project Code | ~~Stage~~ | Total | T1 | T2 | T3 | T4 |
|---|---|---|---|---|---|---|
| A | Historical Long-term Plan | $180.97 | $66.67 | $114.30 | | |
| A | Actual | $172.07 | | $46.84 | $80.32 | $44.91 |

FIG. 4A

| Project Code | Stage | Cost Overrun | Start Date Delay | Duration Increase |
|---|---|---|---|---|
| A | Historical Long-term Plan | -4.92% | 1.00 | 1.00 |

FIG. 4B

| | | | Cluster | |
|---|---|---|---|---|
| Simulation Parameters | | | x | y |
| Start date delay (time units) | Probability distribution | | Triangular | Normal |
| | Pessimistic | | 2.00 | 0.00 |
| | Expected | | -1.00 | 1.00 |
| | Optimistic | | -5.00 | 2.00 |
| Duration increase (time units) | Probability distribution | | Normal | Uniform |
| | Pessimistic | | 0.50 | 2.00 |
| | Expected | | 0.00 | 1.00 |
| | Optimistic | | -0.50 | 0.00 |
| Cost overruns (%) | Probability distribution | | Uniform | Triangular |
| | Pessimistic | | 30% | 10% |
| | Expected | | 5% | 5% |
| | Optimistic | | -20% | 0% |
| Correlation between duration increase and cost overrun | | | -0.15 | 0.75 |

FIG. 5

| Project Code | Stage | Total | T1 | T2 | T3 | T4 |
|---|---|---|---|---|---|---|
| A | Historical Long-term Plan | $180.97 | $66.67 | $114.30 | | |
| A | Historical Short-term Plan | $167.00 | $57.00 | $100.00 | $10.00 | |
| A | Historical Approved for Execution | $170.00 | | $48.00 | $79.00 | $43.00 |
| A | Actual | $172.07 | | $46.84 | $80.32 | $44.91 |

FIG. 6A

| Project Code | Stage | Cost Overrun | Start Date Delay | Duration Increase |
|---|---|---|---|---|
| A | Historical Long-term Plan | -4.92% | 1.00 | 1.00 |
| A | Historical Short-term Plan | 3.03% | 1.00 | 0.00 |
| A | Historical Approved for Execution | 1.22% | 0.00 | 0.00 |

FIG. 6B

| Feature | | | | Label |
|---|---|---|---|---|
| Investment Code | Investment Type | Facility | Investment Owner | Cluster |
| HG150025 | Project | Aphrodite Station | Pederson, Henrik (HPederson) | x |
| HG150024 | Project | Aphrodite Station | Pederson, Henrik (HPederson) | y |
| HG150048 | Project | Apollo Station | Epp, Helmut (HEpp) | z |
| HG150005 | Project | Apollo Station | Farinelli, Robert (RFarinelli) | z |
| HG150015 | Project | Apollo Station | Farinelli, Robert (RFarinelli) | y |
| HG150016 | Project | Apollo Station | Farinelli, Robert (RFarinelli) | w |

FIG. 7

PORTFOLIO PERFORMANCE PREDICTION

FIELD

Embodiments of the present principles generally relate to evaluating a performance of a portfolio of projects, and more particularly, to methods, apparatuses, and systems for portfolio performance prediction.

BACKGROUND

The goal of project management is a successful execution of a project or portfolio of projects. For example, meeting time constraints or schedules, budget constraints and resource usage are common objectives of project management that typically determine success or failure of a project or portfolio of projects. Project executions have uncertainties associated with such parameters as schedule slippages and costs overruns/underruns.

Portfolio Performance Prediction enables portfolio owners to predict the costs, benefits, and risks of their portfolios, including expected values and uncertainties. That is, the ability to accurately predict a performance of a project or portfolio of projects given allocated resources and time constraints is essential to project management to enable the provisioning and/or adjustment of an amount of resources and/or time to be provided for a successful completion of a project or portfolio of projects.

SUMMARY

Embodiments of methods, apparatuses and systems for portfolio performance prediction are disclosed herein.

In some embodiments in accordance with the present principles, a method for portfolio performance prediction of a portfolio of projects includes receiving information regarding start date delays, duration increases and cost overruns for at least one project of the portfolio of projects, determining a cluster for the at least one project from the received information regarding start date delays, duration increases and cost overruns for the at least one project of the portfolio of projects, creating a statistical representation for each of the clusters of the at least one project of the portfolio, and predicting a performance of the portfolio of projects using information regarding the statistical representation of the clusters of the at least one project of the portfolio of projects.

In some embodiments in accordance with the present principles, an apparatus for portfolio performance prediction of a portfolio of projects includes a machine learning module to one of, receive and determine information regarding start date delays, duration increases and cost overruns for at least one project of the portfolio of projects and determine a cluster for the at least one project from the received information regarding the start date delays, duration increases and cost overruns for the at least one project of the portfolio of projects, a distribution module to create a statistical representation for each of the clusters of the at least one project of the portfolio of projects, and a predictor module to predict a performance of the portfolio of projects using information regarding the statistical representation of the clusters of the at least one project of the portfolio of projects.

In some embodiments in accordance with the present principles, a system for portfolio performance prediction of a portfolio of projects includes a processor and a memory coupled to the processor. In such embodiments, the memory can have stored therein at least one of programs or instructions executable by the processor to configure the system to receive information regarding at least start date delays, duration increases and cost overruns for at least one project of the portfolio of projects, determine at least one cluster for the at least one project from the received information regarding at least the start date delays, duration increases and cost overruns for the at least one project of the portfolio of projects, create a statistical representation for each of the clusters of the at least one project of the portfolio of projects, and predict a performance of the portfolio of projects using information regarding the statistical representation of the clusters of the at least one project of the portfolio of projects.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 4a depicts a table listing of costs for a Project A, including a total cost and individual costs at various points in time.

FIG. 4b depicts a table listing of the results for Cost Overrun, Start Date Delay, and Duration Increase for the costs and times of Project A in FIG. 4a.

FIG. 5 depicts a table listing of an exemplary statistical representation of a first Cluster X and a second Cluster Y determined, for example, for Project A of FIGS. 4a and 4b.

FIG. 6a depicts a table listing of costs for a Project A, including total and separate costs at various points in time for a Historical Long-term Plan, a Historical Short-term Plan, a Historical Plan Approved for Execution and an Actual Execution.

FIG. 6b depicts a table listing of the results for Cost Overrun, Start Date Delay, and Duration Increase for the costs and times of Project A in FIG. 6a for each of the Historical Long-term Plan, the Historical Short-term Plan, and the Historical Plan Approved for Execution.

FIG. 7 depicts a table listing of exemplary project features for training a multi-class classification model using a clustered historical data set in accordance with an embodiment of the present principles.

Figure 1:
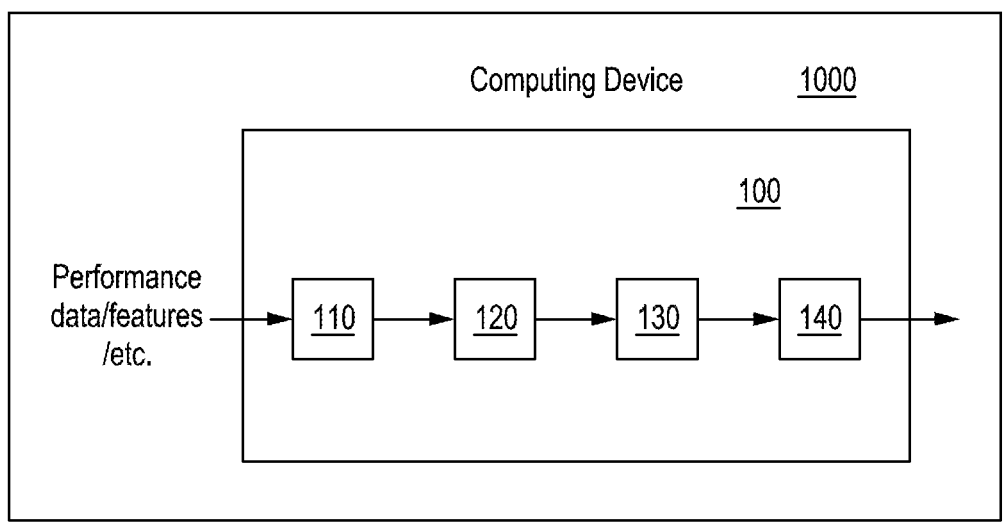
FIG. 1 depicts a high-level block diagram of a portfolio performance prediction system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for portfolio performance prediction. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular quantities of and types of projects in a portfolio, such teachings should not be considered limiting. Embodiments in accordance with the present principles can be implemented using and applied on other quantities of and types of projects within the concepts of the present principles.

Embodiments in accordance with the present principles provide methods, apparatuses and systems for portfolio performance prediction. In some embodiments in accordance with the present principles, prediction parameters such as expected or determined start delays, duration increases and cost overruns for each project of a portfolio along with a statistical representation of a determined cluster(s) for each project of the portfolio of projects are used to predict a performance of a portfolio of projects. Alternatively or in addition, historical data regarding previously recorded start delays, duration increases and cost overruns for each project of a portfolio can be used to predict a performance of the portfolio in accordance with some embodiments of the present principles.

It should be noted that throughout the present disclosure herein, the terms start delays, duration increases and cost overruns are intended to reflect both negative and positive start delays, duration increases and cost overruns. As such in some embodiments, a negative start delay can indicate an earlier start for a project(s) than expected, a negative duration increase can indicate that a project(s) was completed earlier than expected, and a negative cost overrun can indicate that a project(s) was completed for less cost than expected. On the contrary, in some embodiments a positive start delay can indicate a later start for a project(s) than expected, a positive duration increase can indicate that a project(s) took longer to complete than expected, and a positive cost overrun can indicate that a cost for a project(s) was greater than expected. In some embodiments, a negative and a positive connotation can have opposite meanings than described above (vice versa).

FIG. 1 depicts a high-level block diagram of a portfolio performance prediction system 100 in accordance with an embodiment of the present principles. The portfolio performance prediction system 100 of FIG. 1 illustratively comprises a machine learning module 110, a probability distribution module 120, a predictor module 130, and an output module 140.

As depicted in FIG. 1, embodiments of a portfolio performance prediction system can be implemented in a computing device 1000 (described in greater detail in FIG. 10) in accordance with the present principles. That is, in some embodiments data including but not limited to historical performance data, expected performance data, actual performance data, prediction parameters, project features and any other data to be used to predict a portfolio performance in accordance with the present principles can be received by components of the portfolio performance prediction system 100 from the computing device 1000 using any input/output means associated with the computing device 1000. Results of the portfolio performance prediction from a portfolio performance prediction system in accordance with the present principles can be presented to a user using an output device of the computing device 1000, such as a display, a printer or any other form of output device. In some embodiments, inputs and outputs to and from a portfolio performance prediction system in accordance with the present principles, such as the portfolio performance prediction system 100 of FIG. 1, can be accomplished using a graphical user interface (not shown) provided by for example the computing device 1000.

In some embodiments, a predictor, such as the predictor module 130 of the portfolio performance prediction system 100 of FIG. 1, can receive project performance data for each project of a portfolio such as information regarding a start date delay, a duration increase, cost overruns, and, in some embodiments, a statistical representation of determined cluster(s) of each of the projects. The predictor can use such information as prediction parameters to predict a portfolio performance for the projects. In some embodiments, the prediction parameters can optionally further include information regarding a correlation factor between duration increase and cost overruns of the projects.

Figure 2:
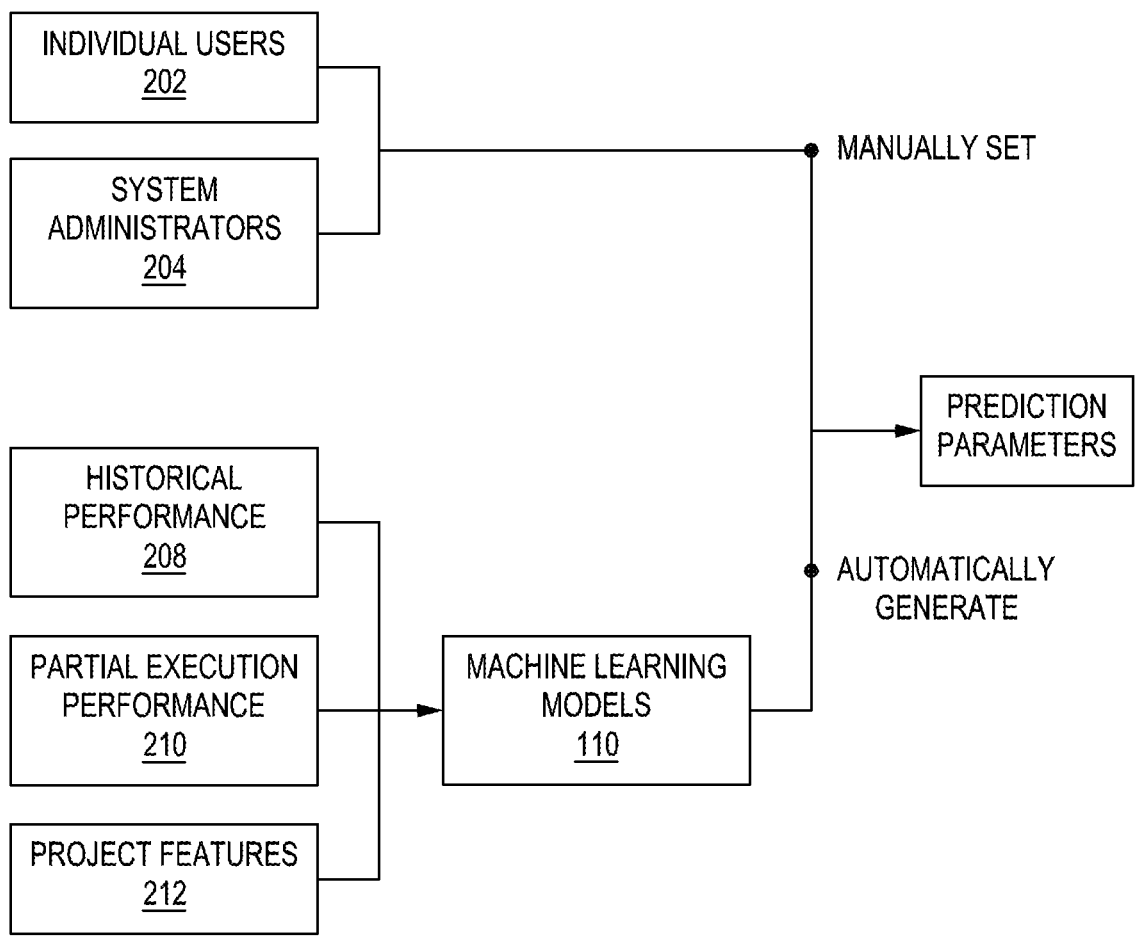
FIG. 2 depicts a graphical representation of possible sources of prediction parameters that can be received by a predictor in accordance with an embodiment of the present principles.

FIG. 2 depicts a graphical representation of possible sources of prediction parameters for predicting a portfolio performance that can be received by a predictor of the present principles, such as the predictor module 130 of the portfolio performance prediction system 100 of FIG. 1, in accordance with an embodiment of the present principles. As illustratively depicted in FIG. 2, in some embodiments prediction parameters for at least some of the projects of a portfolio can be provided by individual system users 202 and/or system administrators 204 and, in such cases, prediction parameters are considered to be manually set. As recited above, in some embodiments such prediction parameters can be provided to the predictor using an input/interface means of the computing device 1000, including but not limited to a keyboard and mouse and a graphical user interface.

As depicted in FIG. 2, alternatively or in addition, prediction parameters for at least some of the projects of a portfolio can be provided to a predictor via machine learning models of, for example, the machine learning module 110. In such embodiments, the machine learning module 110 can obtain data regarding at least one of historical performance 208 and/or partial execution performance 210 of at least some of the projects of the portfolio for at least start date delays, duration increases, and cost overruns from a storage means, such as a local storage means (depicted in FIG. 10) associated with the computing device 1000 or a remote storage means, such as a network storage means or a cloud storage means (depicted in FIG. 11) to automatically determine prediction parameters for the projects. As depicted in FIG. 2, in some embodiments the machine learning module 110 can optionally further use data regarding project features 212, such as stage, owner, facility, duration, type, etc., to automatically determine prediction parameters for the projects.

Figure 3:
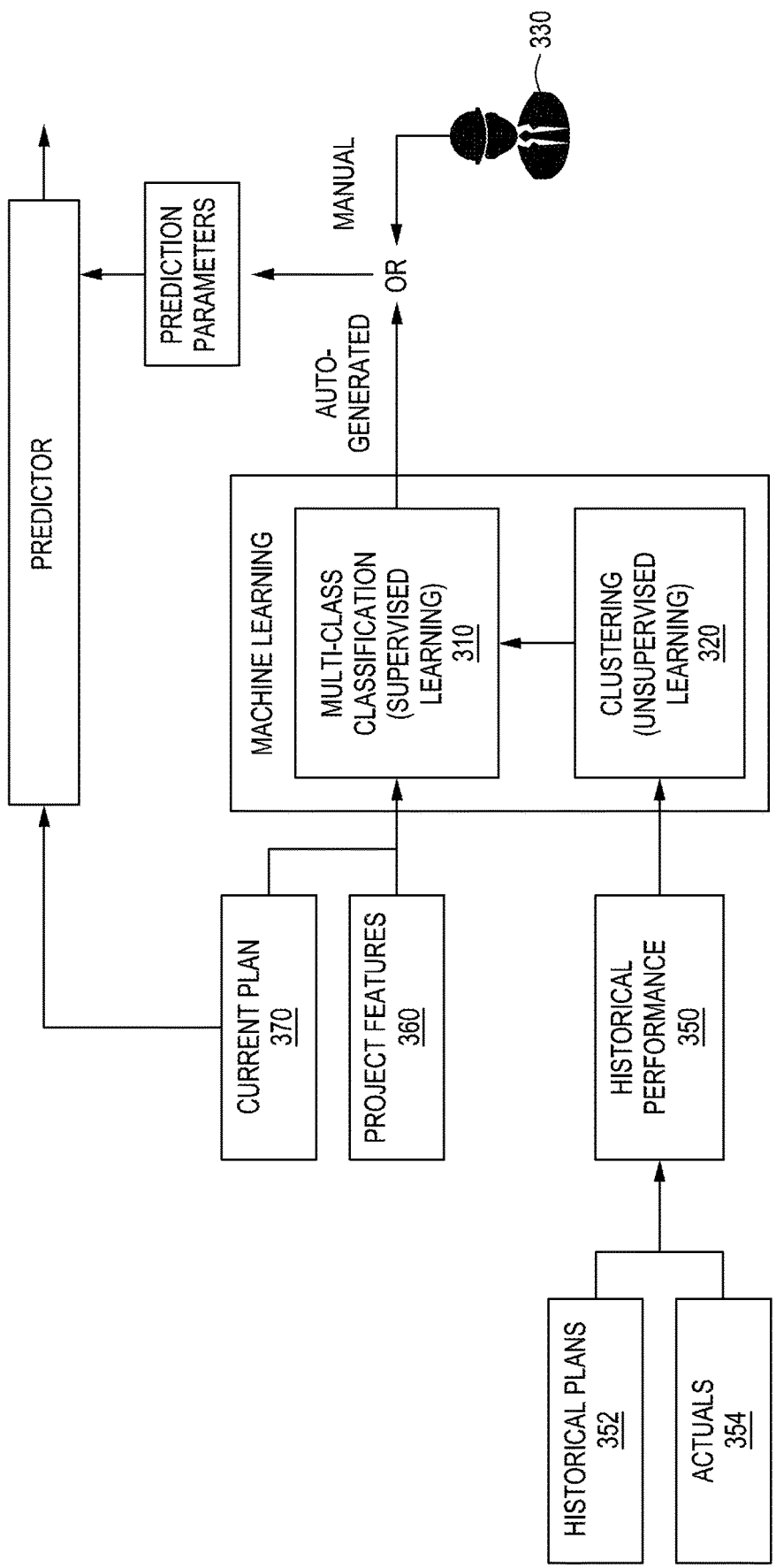
FIG. 3 depicts a graphical representation of a process performed by the machine learning module of the portfolio performance prediction system of FIG. 1 for automatically determining prediction parameters for at least some projects of a portfolio using machine learning modelling in accordance with an embodiment of the present principles.

For example, FIG. 3 depicts a graphical representation of a process performed by the machine learning module 110 of the portfolio performance prediction system 100 of FIG. 1 for automatically determining prediction parameters for at least some projects of a portfolio using machine learning modelling in accordance with an embodiment of the present principles. As depicted in FIG. 3, in some embodiments the machine learning modeling can include at least one of Clustering 310 (Unsupervised Learning) and multi-class classification 320 (Supervised Learning). In embodiments of the present principles, a specific algorithm to be used for the Unsupervised and Supervised Leaning steps depends on a training data set. That is, the algorithm or the combination of algorithms for each step will be selected based on the model performance. For example, in some embodiments clustering algorithms can include but are not limited to K-means algorithms and Hierarchical Clustering algorithms. In some embodiments, multi-class classification algorithms can include but are not limited to Decision Trees, Random Forests, Support Vector Machines (including Linear, Gaussian, Sigmoid Kernel variations), XGBoost, and KNeighbors Classifiers.

As depicted in the embodiment of FIG. 3, in some embodiments the machine learning module 110 of the portfolio performance prediction system 100 uses historical performance data 350 of the projects of a portfolio, such as historical plans 352 and historical actuals 354, for Clustering 310 (Unsupervised Learning) for determining prediction parameters for a predictor 130. As depicted in the embodiment of FIG. 3, in some embodiments the machine learning module 110 can further use project features 360 of the projects of the portfolio and a current plan 370 of the projects of the portfolio for multi-class classification 320 (Supervised Learning) for determining prediction parameters for the predictor 130. Also depicted in FIG. 3 and as recited above, alternatively or in addition in some embodiments a user 330 is able to input prediction parameters for the predictor.

More specifically, in some embodiments implementing clustering, a start delay, duration increase and cost overruns are determined for each project by comparing a historical plan with actual outcomes. For example, FIG. 4a depicts a table listing of costs for a Project A, including a total cost and individual costs at various points in time (e.g., T1, T2, T3 and T4). In the example of FIG. 4a, a Project Cost Overrun is determined by subtracting the total plan cost from the total actual cost; a Project Start Date Delay is determined by subtracting the plan start date from the actual start date; and a Duration Increase is determined by subtracting the plan duration from the actual duration.

FIG. 4b depicts a table listing of the results for Cost Overrun, Start Date Delay, and Duration Increase for the costs and times of Project A in FIG. 4a. As depicted in FIG. 4b, the Cost Overrun for Project A was determined as −4.92%, the determined Start Delay was 1 time unit, and the determined Duration Increase was 1 time unit. That is, as depicted in FIG. 4b, the cost of Project A was 4.92% cheaper than planned, Project A started 1 time unit later than planned, and Project A lasted 1 time unit longer than expected.

In some embodiments, before applying clustering algorithms, the historical performance data is scaled and normalized. The unsupervised learning clustering in accordance with the present principles can then be applied to each project within a Portfolio to provide each project within the Portfolio a cluster label. In some embodiments, an optimum number of clusters depends on the data set.

In some embodiments, the determined cluster information (labels) for each of the projects of a portfolio is communicated to the distribution module 120 of the portfolio performance prediction system 100 of FIG. 1. The distribution module 120 determines a statistical representation of each cluster. For example, in some embodiments for each cluster the distribution module 120 determines a probability distribution including a pessimistic, expected and optimistic values for each of at least the Start Date Delay, the Duration Increase and the Cost Overruns. In some embodiments the distribution module 120 further determines a correlation factor between the Duration Increase and the Cost Overruns. The correlation factor between the Duration Increase and the Cost Overruns is then taken into account when determining the statistical representation of each cluster, which has an effect on a final prediction of the performance of the portfolio of projects made by the predictor module 130.

FIG. 5 depicts a table listing of an exemplary statistical representation of a first Cluster X and a second Cluster Y. In the embodiment of FIG. 5, for the Start Delay, the distribution module 120 applies a triangular distribution model for the first Cluster X and a normal distribution model for the second Cluster Y, to determine Pessimistic, Expected, and Optimistic values. Illustratively in FIG. 5, for the Duration Increase, the distribution module 120 applies a normal distribution model for the first Cluster X and a uniform distribution model for the second Cluster Y, to determine Pessimistic, Expected, and Optimistic values. Finally, in the embodiment of FIG. 5, for the Cost Overruns, the distribution module 120 applies a uniform distribution model for the first Cluster X and a triangular distribution model for the second Cluster Y, to determine a Pessimistic, Expected, and Optimistic values. In some embodiments, the distribution model applied by the distribution module 120 depends on the data set. For example, in some embodiments, a distribution module in accordance with the present principles, such as the distribution module 120 of FIG. 1, can initially apply a random distribution model to data and depending on the resulting values of the data, for example the distribution shape of the resulting values, can subsequently apply a more appropriate/fitting distribution model to the data.

The statistical representation of each cluster of each of the projects of a portfolio determined by the distribution module 120 defines prediction parameters to be used by, in this described embodiment, the predictor module 130 to make a performance prediction for the portfolio of projects.

In some embodiments in which historical data (plans) exist for various approval stages, gates and/or partial executions, multiple clustering information can be determined for each stage of each project of a portfolio for which historical data exists. For example, FIG. 6a depicts a table listing of costs for a Project A, including total and separate costs at various points in time (e.g., T1, T2, T3 and T4) for a Historical Long-term Plan, a Historical Short-term Plan, a Historical Plan Approved for Execution and an Actual Execution. In the example of FIG. 6a, a Project Cost Overrun is determined by subtracting the total plan cost from the total actual cost; a Project Start Date Delay is determined by subtracting the plan start date from the actual start date; and a Duration Increase is determined by subtracting the plan duration from the actual duration.

FIG. 6b depicts a table listing of the results for Cost Overrun, Start Date Delay, and Duration Increase for the costs and times of Project A in FIG. 6a for each of the Historical Long-term Plan, the Historical Short-term Plan, and the Historical Plan Approved for Execution.

As described above, in some embodiments the machine learning modeling of the present principles applied by, for example, the machine learning module 110 can include multi-class classification (Supervised Learning) in accordance with the present principles. For example, each investment within a training set can include attributes, such as "Facility", "Investment Owner", "Total Cost", etc., that can be used as features for the multi-class classification.

FIG. 7 depicts a table listing of exemplary project features for training a multi-class classification model using a clustered historical data set in accordance with an embodiment of the present principles. In the embodiment of FIG. 7, the project features of Investment Code, Investment Type, Facility, and Investment Owner of the depicted clusters are used by, for example, the machine learning module 110 to train the multi-class classification model. Once the multi-class classification model is trained, the model can be used by the machine learning module 110 to classify investments into each cluster. The distribution module 120 can then determine a statistical representation (e.g., probability distribution) of each cluster as described above with reference to, for example, FIGS. 5 and 6.

In some embodiments, the statistical representation (e.g., probability distribution) determined by the distribution module 120 is communicated to the predictor module 130 to be used as prediction parameters for determining a portfolio performance prediction (described in greater detail below) in accordance with the present principles. In some embodiments the predictor module 130 implements Monte Carlo simulations to determine a portfolio performance of a portfolio of the projects from which data was taken. That is, in some embodiments, the predictor module 130 generates inputs, randomly from the statistical representation (e.g., probability distribution) determined by the distribution module 120, for Monte Carlo simulations, which perform a computation on the inputs and aggregate the results for determining a probabilistic portfolio performance prediction.

More specifically, in some embodiments a number of Monte Carlo simulation runs can be determined by a user or can, alternatively or in addition, be determined using a convergence limit. In such embodiments, for each run of the Monte Carlo simulation, a predicted Start Date Delay, a Duration Increase, and a Cost Overrun are generated for each project based on the probability distribution of these parameters. For each run of Monte Carlo simulation, the estimated portfolio spends, and benefits/risk mitigated are the aggregated sum of spends and benefits/risk mitigated by each individual project.

In some embodiments, a predicted portfolio value and the uncertainty range can be defined by a user, based on the percentile of the Monte Carlo simulation estimates. For example, if the predicted value is set up as "P50", it means that 50% of Monte Carlo estimates exceed the predicted value, and 50% of Monte Carlo estimates are less than the predicted value.

Figure 8:
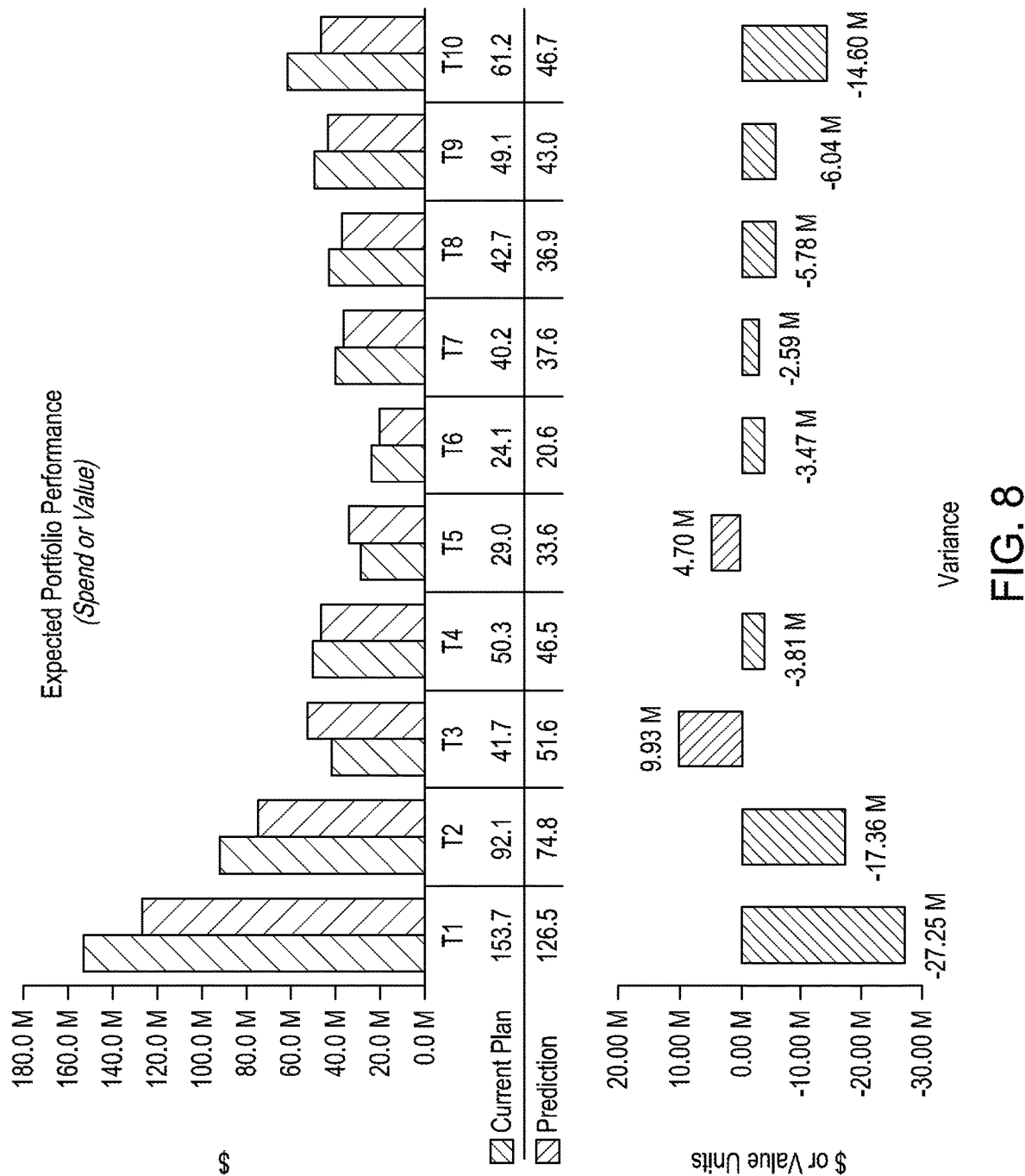
FIG. 8 depicts a bar graph depicting a representation of a predicted portfolio performance in accordance with an embodiment of the present principles.

Returning back to FIG. 1, the output module 140 of the portfolio performance prediction system 100 receives data from at least one of, including but not limited to, a data storage means, the machine learning module 110 and the predictor module 130 and configures the data for display. For example, FIG. 8 depicts a bar graph depicting a representation of a predicted portfolio performance in accordance with an embodiment of the present principles. With reference to FIG. 8, the output module 140 can display received data as a bar graph displaying a cost of a current plan versus a prediction cost for each time period for which data is received. In FIG. 8, a Current Plan cost is plotted against a Predicted cost for each of time periods T1-T10. In some embodiments in accordance with the present principles, each time period can represent a time granularity for which data can be received and for which a prediction can be made, such as daily, weekly, monthly or yearly. As further depicted in FIG. 8, the graph can further include a section (shown below the bar graph) depicting a total variance between the cost of the Current Plan and the Prediction cost for each of the time periods T1-T10.

Figure 9:
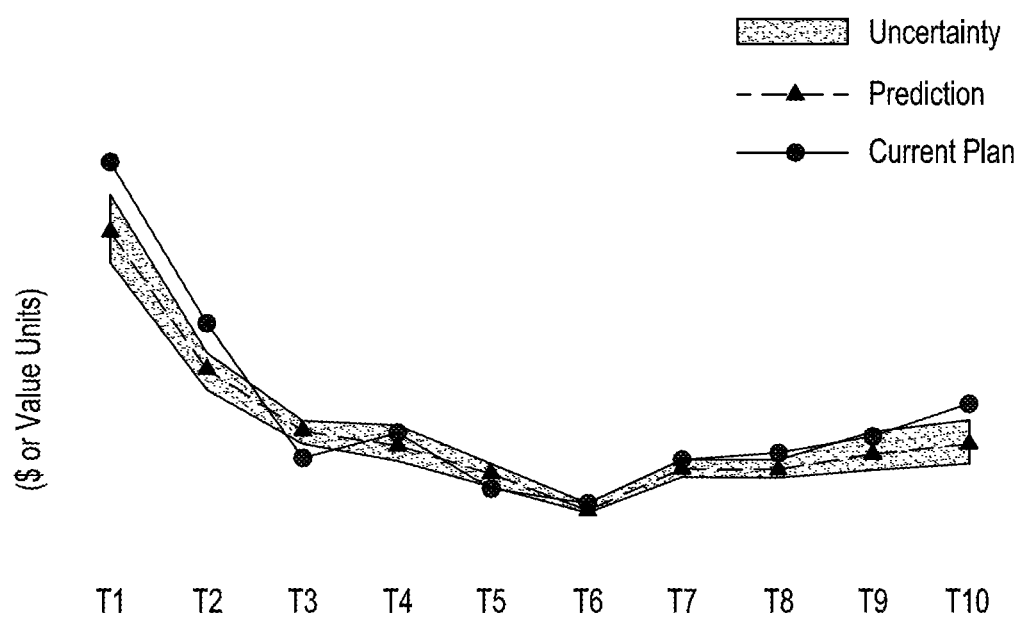
FIG. 9 depicts a line graph depicting a representation of a predicted portfolio performance in accordance with an embodiment of the present principles.

Alternatively or in addition, in some embodiments the output module 140 of the portfolio performance prediction system 100 can display received data as a line graph. For example, FIG. 9 depicts a line graph depicting a representation of a predicted portfolio performance in accordance with an embodiment of the present principles. With reference to FIG. 9, the output module 140 can display received data as a line graph displaying a cost of a current plan using a line of a first style overlaid with a cost prediction using a line of a second style for each time period for which data is received. In FIG. 9, a Current Plan cost is plotted as a solid dark line against a Predicted cost plotted as a dashed dark line for time periods from T1-T10. As further depicted in FIG. 9, the line graph can further include an uncertainty plotted as a thicker, translucent line for time periods from T1-T10.

Figure 10:
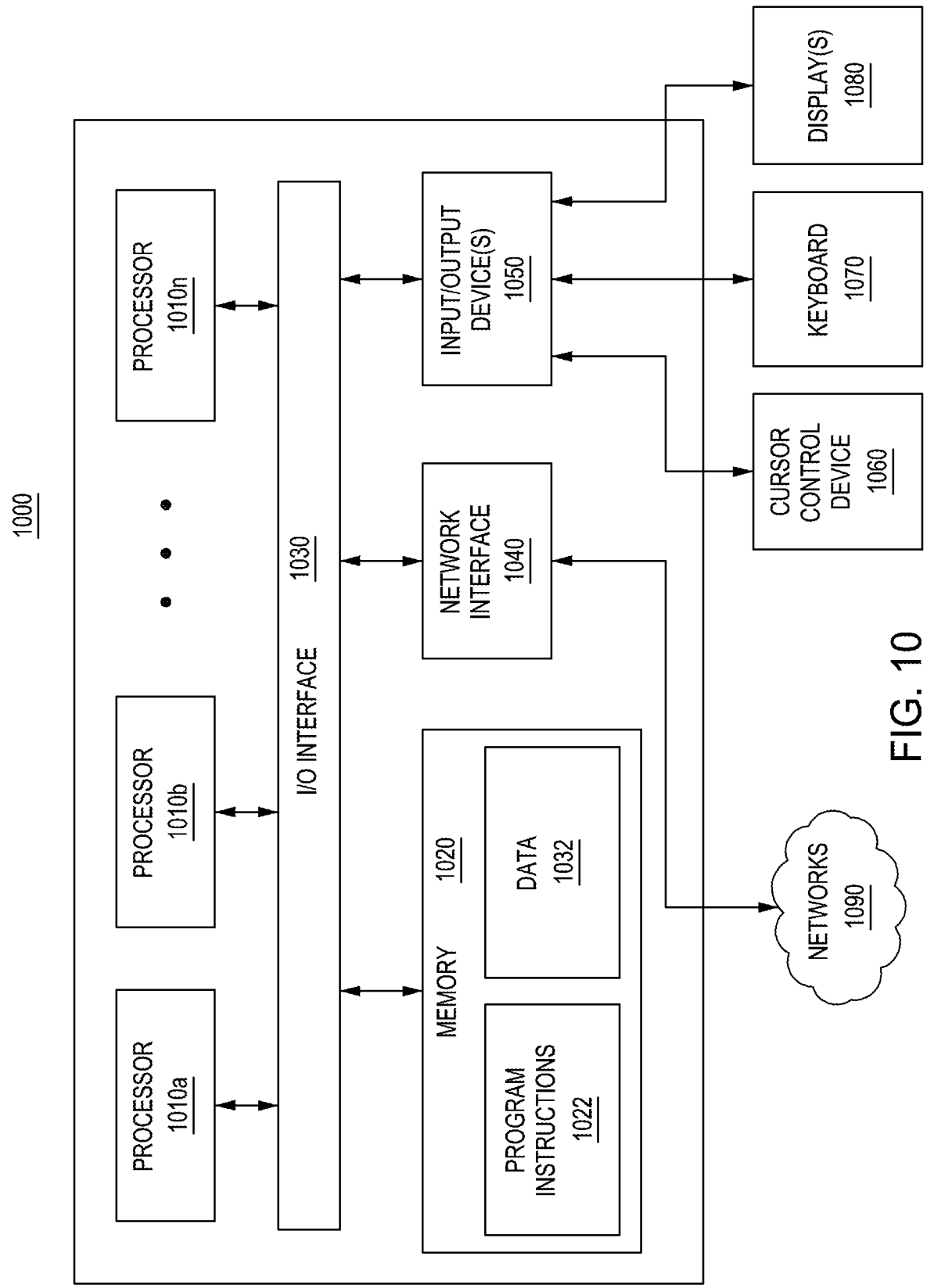
FIG. 10 depicts a high-level block diagram of a computing device in which an embodiment of a portfolio prediction system can be implemented in accordance with an embodiment of the present principles.

FIG. 10 depicts a high-level block diagram of a computing device 1000 for implementing embodiments of a portfolio performance prediction system, such as the portfolio performance prediction system 100 of FIG. 1 in accordance with embodiments of the present principles. In some embodiments computing device 1000 can be configured to implement methods of the present principles, such as at least the method 1200 as processor-executable program instructions 1022 (e.g., program instructions executable by processor(s) 1010) in some embodiments.

In the embodiment of FIG. 10, computing device 1000 includes one or more processors 1010a-1010n coupled to a system memory 1020 via an input/output (I/O) interface 1030. Computing device 1000 further includes a network interface 1040 coupled to I/O interface 1030, and one or more input/output devices 1050, such as cursor control device 1060, keyboard 1070, and display(s) 1080. In various embodiments, any of the components can be utilized by the system to receive user input described above. In various embodiments, a user interface can be generated and displayed on display 1080. In some cases, it is contemplated that embodiments can be implemented using a single instance of computing device 1000, while in other embodiments multiple such systems, or multiple nodes making up computing device 1000, can be configured to host different portions or instances of various embodiments. For example, in one embodiment some elements can be implemented via one or more nodes of computing device 1000 that are distinct from those nodes implementing other elements. In another example, multiple nodes may implement computing device 1000 in a distributed manner.

In different embodiments, computing device 1000 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 1000 can be a uniprocessor system including one processor 1010, or a multiprocessor system including several processors 1010 (e.g., two, four, eight, or another suitable number). Processors 1010 can be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1020. In other embodiments, program instructions and/or data can be received, sent or stored upon different types of computer-accessible media or on similar media separate from system memory 1020 or computing device 1000.

In one embodiment, I/O interface 1130 can be configured to coordinate I/O traffic between processor 1010, system memory 1020, and any peripheral devices in the device, including network interface 1040 or other peripheral interfaces, such as input/output devices 1050. In some embodiments, I/O interface 1030 can perform any necessary protocol, timing or other data transformations to convert data signals from one component (e.g., system memory 1020) into a format suitable for use by another component (e.g., processor 1010). In some embodiments, I/O interface 1030 can include support for devices attached through various types of peripheral buses, such as a variant of the Peripheral Component Interconnect (PCI) bus standard or the Universal Serial Bus (USB) standard, for example. In some embodiments, the function of I/O interface 1030 can be split into two or more separate components, such as a north bridge and a south bridge, for example. Also, in some embodiments some or all of the functionality of I/O interface 1030, such as an interface to system memory 1020, can be incorporated directly into processor 1010.

Network interface 1040 can be configured to allow data to be exchanged between computing device 1000 and other devices attached to a network (e.g., network 1090), such as one or more external systems or between nodes of computing device 1000. In various embodiments, network 1090 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1050 can, in some embodiments, include one or more display terminals, keyboards, keypads, touchpads, scanning devices, voice or optical recognition devices, or any other devices suitable for entering or accessing data by one or more computer systems. Multiple input/output devices 1050 can be present in computer system or can be distributed on various nodes of computing device 1000. In some embodiments, similar input/output devices can be separate from computing device 1000 and can interact with one or more nodes of computing device 1000 through a wired or wireless connection, such as over network interface 1040.

Figure 12:
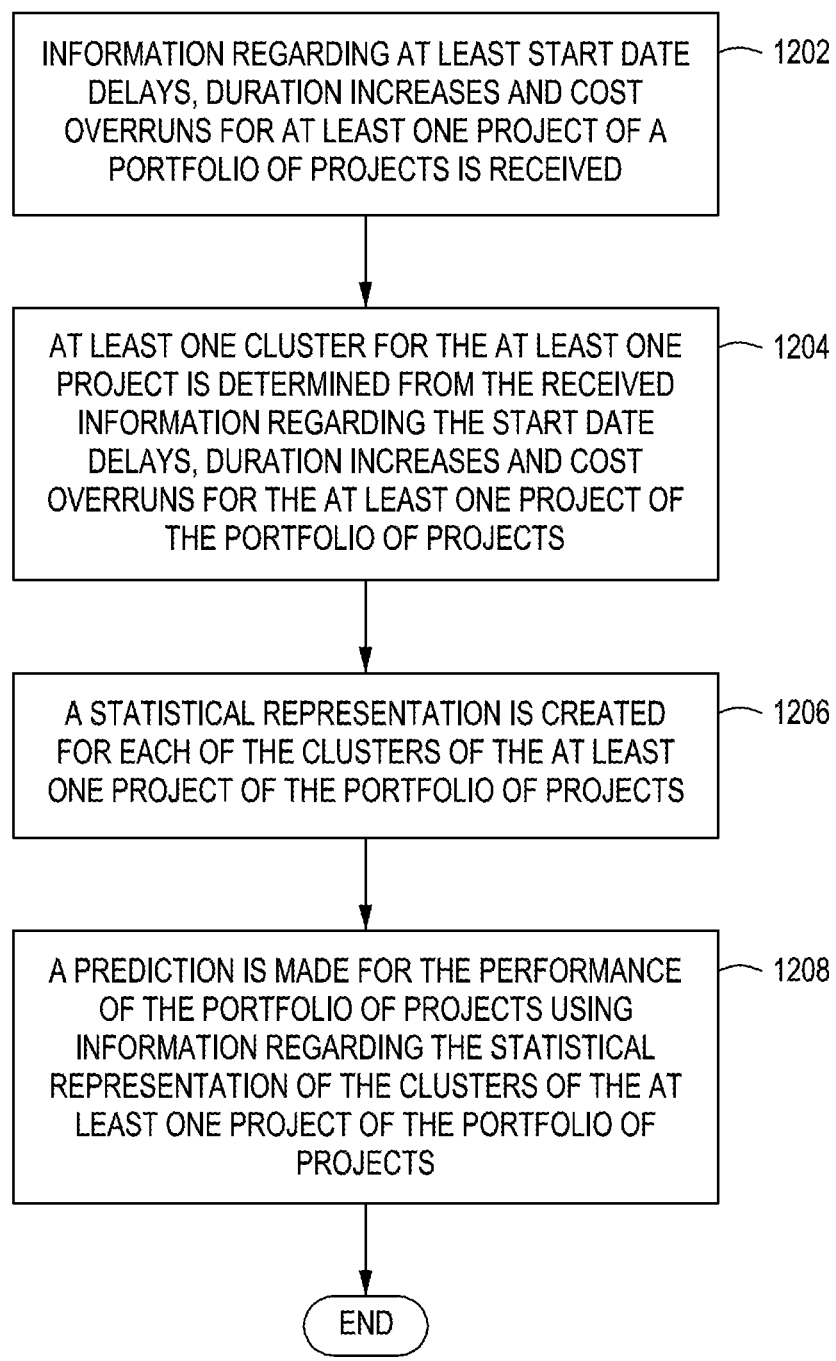
FIG. 12 depicts a flow diagram of a method for portfolio performance prediction of a portfolio of projects in accordance with an embodiment of the present principles.

In some embodiments, the illustrated computing device 1000 can implement any of the operations and methods described above, such as the methods illustrated by the flowchart of FIG. 12. In other embodiments, different elements and data can be included.

Those skilled in the art will appreciate that computing device 1000 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 1000 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 1000 can be transmitted to computing device 1000 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 11:
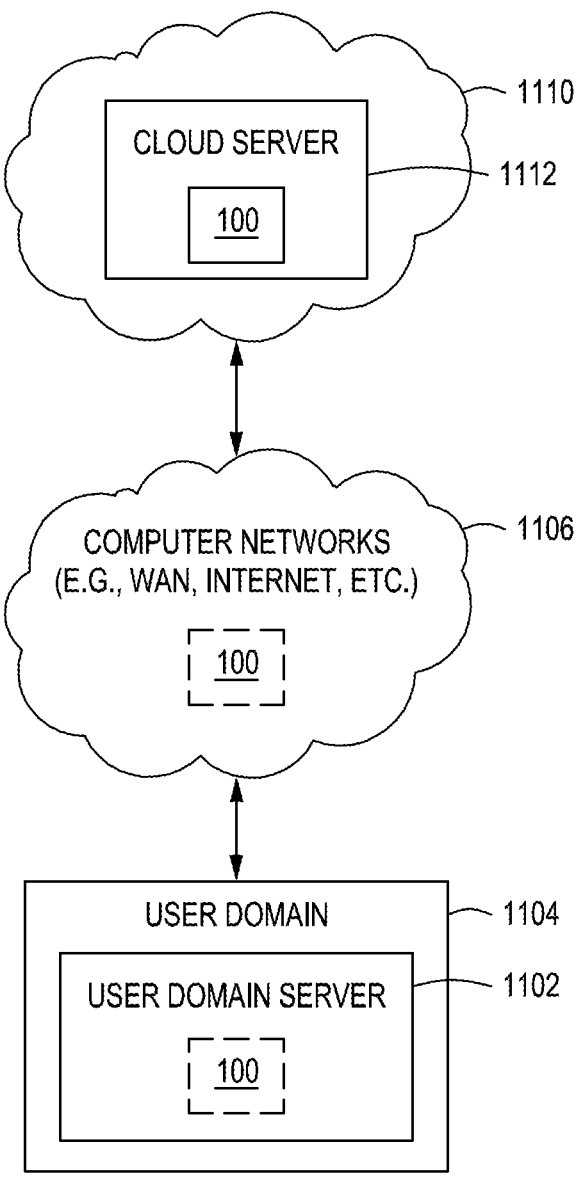
FIG. 11 depicts a high-level block diagram of a network in which embodiments of a portfolio performance prediction system in accordance with the present principles can be applied.

FIG. 11 depicts a high-level block diagram of a network in which embodiments of a portfolio performance prediction system in accordance with the present principles can be applied. The network environment 1100 of FIG. 111 illustratively comprises a user domain 1102 including a user domain server 1104. The network environment 1100 of FIG. 11 further comprises computer networks 1106, and a cloud environment 1110 including a cloud server 1112.

In the network environment 1100 of FIG. 11, a portfolio performance prediction system in accordance with the present principles, such as the portfolio performance prediction system 100 of FIG. 1 can be implemented in at least one of the user domain server 1104, the computer networks 1106 and the cloud server 1112. That is, in some embodiments, a user can use a local server (e.g., the user domain server 1104) to provide performance data/features and the like that can be used to determine a portfolio performance prediction in accordance with the present principles and as described above.

In some embodiments, a user can implement a computing device of a portfolio performance prediction system in the computer networks 1106 to provide performance data/features and the like that can be used to determine a portfolio performance prediction in accordance with the present principles and as described above. Alternatively or in addition, in some embodiments, a user can implement a computing device of a portfolio performance prediction system in the cloud server 1112 of the cloud environment 1110 to provide performance data/features and the like that can be used to determine a portfolio performance prediction in accordance with the present principles and as described above. For example, in some embodiments it can be advantageous to perform processing functions of the present principles in the cloud environment 1110 to take advantage of the processing capabilities of the cloud environment 1110. In some embodiments in accordance with the present principles, a portfolio performance prediction system can be located in a single or multiple locations/servers/computers to perform all or portions of the herein described functionalities of a portfolio performance prediction system in accordance with the present principles.

FIG. 12 depicts a flow diagram of a method 1200 for portfolio performance prediction of a portfolio of projects in accordance with an embodiment of the present principles. The method 1200 begins at 12202 during which information regarding at least start date delays, duration increases and cost overruns for at least one project of the portfolio of projects is received. As described above, in some embodiments start date delays, duration increases, and cost overruns of projects could be positive or negative and can defined by at least one of, manually by users of a project or a group of projects, manually by a system administrator for a project or a group of projects, or automatically by machine learning models having historical data. The method 1200 can proceed to 1204.

At 1204, at least one cluster for the at least one project is determined from the received information regarding at least the start date delays, duration increases and cost overruns for the at least one project of the portfolio of projects. As described above, in some embodiments clustering can be determined by applying at least one machine learning model to the received information regarding the at least start date delays, duration increases and cost overruns for the at least one project of the portfolio of projects. As described above, in some embodiments the machine learning model can include a clustering model/algorithm. The method 1200 can proceed to 1206.

At 1206, a statistical representation is created for each of the clusters of the at least one project of the portfolio. As described above, in some embodiments a distribution model is applied to the cluster information to determine a probability distribution for each of the clusters. The method 1200 can proceed to 1208.

At 1208, a prediction is made for the performance of the portfolio of projects using information regarding the statistical representation of the clusters of the at least one project of the portfolio of projects. As described above, in some embodiments Monte Carlo simulations can be used to determine a performance of the portfolio of projects using information regarding the statistical representation of the clusters of the at least one project of the portfolio of projects. The method 1200 can be exited.

Embodiments of Portfolio Performance Prediction in accordance with the present principles can be implemented in a support tool enabling a portfolio owner/manager to determine and understand if future budgets will be sufficient given project uncertainties and/or to understand if more investments need to be added to the plan to realize the future budget. Such information can be used to quantify the likelihood of delivering planned benefits/risk mitigation.

Embodiments of Portfolio Performance Prediction in accordance with the present principles can further be implemented in a performance management support tool to understand if an execution plan will consume all the expected budget in a current planned time period and to better predict short-term and long-term cash flows.

That is, typically projects get delayed and organizations end up underspending in the earlier part of their plans only to overspend during the latter part of their plans. Embodiments of Portfolio Performance Prediction in accordance with the present principles create a more accurate prediction of portfolio performance by taking into consideration schedule and cost uncertainties of every project. So, if a Portfolio Performance Prediction in accordance with the present principles predicts underspending, organizations can rationally over program, which is to plan to spend more funds than budgeted or even to execute more work, queuing up projects earlier. More specifically, if an overspend is being predicted, a portfolio owner/manager can reduce a number of or slow down projects or increase budget. If an underspend is being predicted, a portfolio owner/manager can over program and start more projects, get more projects ready to 'fill in,' or decrease budget. If a delay is predicted, a portfolio owner/manager can properly update/set expectations on when projects will be realistically completed.

Embodiments of Portfolio Performance Prediction in accordance with the present principles address at least the following problems: a) paying interest on funds that didn't get spent; b) having difficulties obtaining similar funding levels in the future; and c) negative public perception. In summary, Portfolio Performance Prediction in accordance with the present principles assist portfolio owners to proactively reallocate funds and resources for reaching targets.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for portfolio performance prediction of a portfolio of projects, the method comprising:
   receiving information regarding at least start date delays, duration increases and cost overruns for at least one project of the portfolio of projects;
   training a machine learning model, using historical performance data for the at least one project and at least one of supervised or unsupervised machine learning modeling, to determine at least one of a cluster or a classification for the received information regarding the start date delays, duration increases and cost overruns for the at least one project;
   determining, using the trained machine learning model, at least one cluster for the at least one project from the received information regarding at least the start date delays, duration increases and cost overruns for the at least one project of the portfolio of projects by grouping results of performance metrics that are based on a comparison of at least one historical plan with actual performance outcomes;
   creating a statistical representation for each of the clusters of the at least one project of the portfolio of projects, including at least pessimistic, expected and optimistic values for each of the clusters;
   predicting a performance of the at least one project of the portfolio of projects using information regarding the statistical representation of the clusters of the at least one project of the portfolio of projects;
   updating a resource allocation schedule, that was determined based on an expected performance of the at least one project of the portfolio of projects, based on a comparison between the predicted performance of the at least one project of the portfolio of projects and the expected performance of the at least one project of the portfolio of projects; and
   distributing at least one of funds or resources for the performance of the portfolio of projects in accordance with the updated resource allocation schedule.

2. The method of claim 1, wherein information to be used for predicting a performance of the portfolio of projects is received from an administrator of the at least one project.

3. The method of claim 1, wherein the information regarding the at least start date delays, duration increases and cost overruns for the at least one project of the portfolio of projects is automatically determined using the machine learning modeling and historical data.

4. The method of claim 1, wherein the at least one cluster for the at least one project is determined using unsupervised machine learning modeling including at least one of K-means algorithms or Hierarchical Clustering algorithms.

5. The method of claim 1, wherein the statistical representation for each of the clusters of the at least one project of the portfolio is created by determining a probability distribution, including a pessimistic, expected and optimistic values, for each of at least the start date delays, the duration increases and the cost overruns of the at least one project of the portfolio of projects.

6. The method of claim 5, wherein the probability distribution is determined using at least one of a triangular distribution model, a normal distribution model, and a uniform distribution model.

7. The method of claim 1, wherein the performance of the portfolio of projects is predicted using Monte Carlo simulations.

8. The method of claim 1, further comprising:
determining a correlation factor between the duration increases and the cost overruns for the at least one project of the portfolio of projects for use in predicting the performance of the portfolio of projects.

9. The method of claim 1, further comprising:
using supervised learning modeling, including at least one of Decision Trees, Random Forests, Support Vector Machines, XGBoost, and KNeighbors Classifiers, to determine multi-class classification of features of the at least one project of the portfolio of projects for use in the determining of at least one cluster for the at least one project.

10. The method of claim 1, further comprising:
normalizing and scaling the received information regarding the at least start date delays, duration increases and cost overruns for the at least one project of the portfolio of projects prior to the determining of at least one cluster.

11. The method of claim 1, further comprising:
plotting the predicted performance of the portfolio of projects on a graphical display as the predicted performance of the portfolio of projects versus a current performance of the portfolio of projects to assist in the distribution of the at least one of the funds or the resources for the performance of the portfolio of projects.

12. An apparatus for portfolio performance prediction of a portfolio of projects, comprising:
a machine learning module configured to at least one of receive and determine information regarding at least start date delays, duration increases and cost overruns for at least one project of the portfolio of projects to train a machine learning model, using historical performance data for the at least one project and at least one of supervised or unsupervised machine learning modeling, to determine at least one of a cluster or a classification for the received information regarding the start date delays, duration increases and cost overruns for the at least one project, and configured to determine, using the trained machine learning model, at least one cluster for the at least one project from the received information regarding at least the start date delays, duration increases and cost overruns for the at least one project of the portfolio of projects by grouping results of performance metrics that are based on a comparison of at least one historical plan with actual performance outcomes;
a distribution module to create a statistical representation for each of the clusters of the at least one project of the portfolio of projects, including at least pessimistic, expected and optimistic values for each of the clusters;
a predictor module to predict a performance of the at least one project of the portfolio of projects using information regarding the statistical representation of the clusters of the at least one project of the portfolio of projects, update a resource allocation schedule, that was determined based on an expected performance of the at least one project of the portfolio of projects, based on a comparison between the predicted performance of the at least one project of the portfolio of projects and the expected performance of the at least one project of the portfolio of projects; and
distribute at least one of funds or resources for the performance of the portfolio of projects in accordance with the updated resource allocation schedule.

13. The apparatus of claim 12, wherein the machine learning module receives information regarding the at least start date delays, duration increases and cost overruns for the at least one project of the portfolio of projects from an administrator of the at least one project.

14. The apparatus of claim 12, wherein the machine learning module automatically determines information regarding the at least start date delays, duration increases and cost overruns for the at least one project of the portfolio of projects using the machine learning modeling and historical data.

15. The apparatus of claim 12, wherein the machine learning module determines the at least one cluster for the at least one project using unsupervised machine learning modeling including at least one of K-means algorithms or Hierarchical Clustering algorithms.

16. The apparatus of claim 12, wherein the distribution module creates the statistical representation for each of the clusters of the at least one project of the
portfolio by determining a probability distribution, including a pessimistic, expected and optimistic values, for each of at least the start date delays, the duration increases and the cost overruns of the at least one project of the portfolio of projects.

17. The apparatus of claim 16, wherein the probability distribution module determines the probability distribution by applying at least one of a triangular distribution model, a normal distribution model, and a uniform distribution model.

18. The apparatus of claim 12, wherein the predictor module predicts a performance of the portfolio of projects using Monte Carlo simulations.

19. The apparatus of claim 12, wherein the machine learning module determines a correlation factor between the duration increases and the cost overruns for the at least one project of the portfolio of projects for use by the predictor module in predicting the performance of the portfolio of projects.

20. The apparatus of claim 12, wherein the machine learning module implements supervised learning modeling, including at least one of Decision Trees, Random Forests, Support Vector Machines, XGBoost, and KNeighbors Classifiers, to determine multi-class classification of features of the at least one project of the portfolio of projects for use in the determining of at least one cluster for the at least one project.

21. The apparatus of claim 12, wherein the received information regarding the at least start date delays, duration increases and cost overruns for the at least one project of the portfolio of projects is normalized and scaled prior to the determining of at least one cluster.

22. The apparatus of claim 12, further comprising:
an output module to cause a plotting of the predicted performance of the portfolio of projects on a graphical display as the predicted performance of the portfolio of projects versus a current performance of the portfolio of projects to assist in the distribution of the at least one of the funds or the resources for the performance of the portfolio of projects.

23. A system for portfolio performance prediction of a portfolio of projects, comprising:
- a processor; and
- a memory coupled to the processor, the memory having stored therein at least one of programs or instructions executable by the processor to configure the system to:
- receive information regarding at least start date delays, duration increases and cost overruns for at least one project of the portfolio of projects;
- train a machine learning model, using historical performance data for the at least one project and at least one of supervised or unsupervised machine learning modeling, to determine at least one of a cluster or a classification for the received information regarding the start date delays, duration increases and cost overruns for the at least one project;
- determine, using the trained machine learning module, at least one cluster for the at least one project from the received information regarding at least the start date delays, duration increases and cost overruns for the at least one project of the portfolio of projects by grouping results of performance metrics that are based on a comparison of at least one historical plan with actual performance outcomes;
- create a statistical representation for each of the clusters of the at least one project of the portfolio of projects, including at least pessimistic, expected and optimistic values for each of the clusters;
- predict a performance of the at least one project of the portfolio of projects using information regarding the statistical representation of the clusters of the at least one project of the portfolio of projects;
- update a resource allocation schedule, that was determined based on an expected performance of the at least one project of the portfolio of projects, based on a comparison between the predicted performance of the at least one project of the portfolio of projects and the expected performance of the at least one project of the portfolio of projects; and
- distribute at least one of funds or resources for the performance of the portfolio of projects in accordance with the updated resource allocation schedule.

\* \* \* \* \*